United States Patent
Wang

(10) Patent No.: US 10,638,308 B2
(45) Date of Patent: Apr. 28, 2020

(54) NETWORK SLICE MANAGEMENT APPARATUS AND NETWORK SLICE MANAGEMENT METHOD

(71) Applicant: HUAWEI TECHNOLOGIES CO., LTD., Shenzhen, Guangdong (CN)

(72) Inventor: Xiaoyan Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/022,972

(22) Filed: Jun. 29, 2018

(65) Prior Publication Data

US 2018/0310169 A1 Oct. 25, 2018

Related U.S. Application Data

(63) Continuation of application No. PCT/CN2016/111939, filed on Dec. 24, 2016.

(30) Foreign Application Priority Data

Dec. 31, 2015 (CN) .......................... 2015 1 1031163

(51) Int. Cl.
*H04W 8/26* (2009.01)
*H04W 48/18* (2009.01)
(Continued)

(52) U.S. Cl.
CPC .......... *H04W 8/26* (2013.01); *H04L 61/1511* (2013.01); *H04L 61/2007* (2013.01);
(Continued)

(58) Field of Classification Search
CPC ....... H04W 48/18; H04W 4/70; H04W 48/14; H04W 24/02; H04W 16/10; H04W 28/0247; H04W 8/02; H04W 76/10
See application file for complete search history.

(56) References Cited

U.S. PATENT DOCUMENTS

2011/0093564 A1* 4/2011 Li ..................... H04L 12/6418
709/217
2012/0106488 A1* 5/2012 Nylander .......... H04L 29/12066
370/329
(Continued)

FOREIGN PATENT DOCUMENTS

CN 102461316 A 5/2012
CN 104581990 A 4/2015
(Continued)

OTHER PUBLICATIONS

Takuya Shimojo et al. Future Mobile Core Network for Efficient Service Operation, 2015 IEEE. total 6 pages. XP32782142.
(Continued)

*Primary Examiner* — Dung Hong
(74) *Attorney, Agent, or Firm* — Fish & Richardson P.C.

(57) ABSTRACT

Embodiments of the present disclosure provide a network slice management apparatus, a service capability exposure function apparatus, and a network slice management method. According to the network slice management apparatus and the service capability exposure function apparatus in the present disclosure, the service capability exposure function apparatus obtains, based on information provided in an application request, information corresponding to a network slice of a core network. The service capability exposure function apparatus further queries an address of a network element in the network slice and communicates with the network element.

6 Claims, 6 Drawing Sheets

(51) Int. Cl.
*H04L 29/12* (2006.01)
*H04L 29/06* (2006.01)
*H04L 29/08* (2006.01)

(52) U.S. Cl.
CPC .......... *H04L 65/1063* (2013.01); *H04L 67/20* (2013.01); *H04W 48/18* (2013.01)

(56) References Cited

U.S. PATENT DOCUMENTS

| | | | |
|---|---|---|---|
| 2015/0109995 A1* | 4/2015 | Mathai ................. | H04L 61/301 370/328 |
| 2017/0164212 A1* | 6/2017 | Opsenica ............. | H04W 12/06 |
| 2018/0139797 A1* | 5/2018 | Chun ................. | H04W 28/0215 |
| 2018/0184331 A1* | 6/2018 | Samdanis ............ | H04W 28/16 |
| 2018/0227768 A1* | 8/2018 | Samdanis ............ | H04W 16/14 |
| 2018/0227837 A1* | 8/2018 | Starsinic ............. | H04W 4/70 |
| 2018/0310238 A1* | 10/2018 | Opsenica ............ | H04W 12/06 |
| 2018/0324187 A1* | 11/2018 | Heintel ............... | H04L 63/08 |
| 2018/0332632 A1* | 11/2018 | Vikberg .............. | H04W 48/08 |
| 2018/0352416 A1* | 12/2018 | Ryu .................... | H04W 4/70 |
| 2018/0352501 A1* | 12/2018 | Zhang ................. | H04W 48/18 |
| 2019/0020996 A1* | 1/2019 | Zhang ................. | H04W 8/14 |
| 2019/0124671 A1* | 4/2019 | Starsinic ............. | H04W 4/70 |

FOREIGN PATENT DOCUMENTS

| | | |
|---|---|---|
| EP | 2592789 A1 | 5/2013 |
| EP | 2866495 A2 | 4/2015 |
| JP | 2008054189 A | 3/2008 |
| JP | 2008227756 A | 9/2008 |

OTHER PUBLICATIONS

3GPP TR 23.708 V13.0.0, 3rd Generation Partnership Project;Technical Specification Group Services and System Aspects;Architecture enhancements for service capability exposure(Release 13), Jun. 2015. total 32 pages. XP50966250.

Extended European Search Report issued in European Application No. 1688116.4 dated Oct. 5, 2018, 18 pages.

3GPP TR 23.708 V13.0.0 (Jun. 2015),3rd Generation Partnership Project;Technical Specification Group Services and System Aspects;Architecture enhancements for service capability exposure(Release 13),total 31 pages.

International Search Report and Written Opinion issued in International Application No. PCT/CN2016/111939 dated Mar. 22, 2017, 9 pages.

\* cited by examiner

NETWORK SLICE MANAGEMENT APPARATUS AND NETWORK SLICE MANAGEMENT METHOD

CROSS-REFERENCE TO RELATED APPLICATIONS

This application is a continuation of International Application PCT/CN2016/111939, filed on Dec. 24, 2016, which claims priority to Chinese Patent Application No. 201511031163.7, filed on Dec. 31, 2015. The disclosures of the aforementioned applications are hereby incorporated by reference in their entireties.

TECHNICAL FIELD

The present invention relates to communications technologies, and in particular, to a network slice management apparatus and a network slice management method.

BACKGROUND

As mobile operators are diversifying operation modes, the operators expose network information as capabilities to third parties to promote generation of new business modes. A service capability exposure function (SCEF) entity is added in the network capability exposure project of the 3GPP to screen network topologies and expose network information. A network architecture 1 for implementing the service capability exposure function entity in the project is shown in FIG. 1.

In FIG. 1, the network architecture 1 includes application servers 101 and 102, a service capability exposure function apparatus 103, and network elements 104 to 107. The service capability exposure function apparatus 103 includes application programming interfaces 103a to 103c. The service capability exposure function apparatus 103 may collaborate with the application server 101 and the application server 102 through the application programming interfaces 103a to 103c. The application server 101 and the application server 102 may implement applications (for example, self-operated services of operators) of third parties or in trusted domains of operators.

Moreover, the service capability exposure function apparatus 103 may interact with the network elements 104 to 107 to obtain information required for applications. Some typical network capability exposure functions defined in current standards are as follows:

A third-party application needs to obtain a quantity of users in a geographical region. Steps are as follows:

The application sends a request to the service capability exposure function apparatus 103. The request carries a message type instructing to obtain a quantity of users in a geographical region and also carries geographical region information.

The service capability exposure function apparatus 103 maps the geographical region to a routing area identifier (RAI)/serving area identifier (SAI)/cell identifier (CID) list based on the geographical region information and configuration information in the request, and further maps the RAI/SAT/CID list to a network element such as a mobility management entity (MME), serving GPRS support node (SGSN).

The service capability exposure function apparatus 103 queries an MME/SGSN node for an RAI/SAI/CID, to obtain quantities of users at these locations.

The service capability exposure function apparatus 103 returns the quantities of users to the application (to be specific, the application server 101 and/or the application server 102 implementing the application).

A third-party application initiates a QoS request for accessing an application to the service capability exposure function apparatus 103, so that when a user accesses the application, QoS of a service flow corresponding to the application is guaranteed. Steps are as follows:

The application initiates a QoS guarantee request to the service capability exposure function apparatus 103. The request message carries a flow feature (for example, an IP address of an application server) of the application and a QoS parameter required for the application.

The service capability exposure function apparatus 103 finds a policy and charging rules function (PCRF) based on a configuration, and sends the flow feature of the application and the required QoS to the PCRF.

The service capability exposure function apparatus 103 provides QoS guarantee for a flow of the application based on the flow feature of the application.

A concept of a network slice is proposed in the SMARTER project (future-oriented 5G networks) of 3GPP SA1. To be specific, different networks are established to satisfy requirements of different Internet of things applications. The different networks herein may be referred to as network slices. Based on requirements of different applications, each network slice includes at least one network element required for each application. In addition, in the current 3GPP DECOR (a dedicated core network, which is for an existing network) project, it is proposed that corresponding dedicated core networks can be established for different MVNO, enterprise or IoT applications, to satisfy different network requirements of the applications. Therefore, it can be learned that a dedicated core network is a form of a network slice.

For the combination of a dedicated core network (a network slice) and a network capability exposure characteristic, currently there is still no technical solution in which an SCEF can find network elements (that is, the network element 104, the network element 105, the network element 106, and the network element 107 in FIG. 1) in a dedicated core network (that is, a network slice corresponding to an application).

SUMMARY

An objective of the present invention is to provide a network slice management system that can correctly find a network element in a network slice of a core network.

To achieve the foregoing objective, a first embodiment of the present invention provides a network slice management apparatus collaborating with a service capability exposure function apparatus and an application management apparatus, including: a communicator, configured to receive a network slice creation request from the application management apparatus, where the network slice creation request includes a network slice feature and a network slice feature name; a processor, configured to: generate a network slice identifier based on the network slice feature, and establish a name-identifier relationship between the network slice identifier and a network slice feature name; and a memory, configured to store the name-identifier relationship, where the transceiver is further configured to: send the name-identifier relationship to the service capability exposure function apparatus, and send a network slice creation response to the application management apparatus.

With reference to the first embodiment, in another possible first implementation, the network slice management apparatus further collaborates with a domain name system, the processor is further configured to: generate a network slice based on the network slice feature, and establish a mapping between a network element domain name of a network element included in the network slice and an Internet Protocol address, and the transceiver is further configured to send the mapping to the domain name system.

To achieve the foregoing objective, a second embodiment of the present invention provides a network slice management apparatus collaborating with a service capability exposure function apparatus and an application server, including: a memory, configured to store network slice information; a communicator, configured to receive a network element address query request from the service capability exposure function apparatus, where the network element address query request includes application information and a network element type indication, and the network element type indication is used to indicate a network element having an Internet Protocol address to be obtained by the application server; and a processor, configured to: obtain network slice information from the memory based on the application information, and obtain, based on the network slice information and the network element type indication, the Internet Protocol address that is of the network element and that is to be obtained by the application server, where the communicator is further configured to send the Internet Protocol address that is of the network element and that is to be obtained by the application server to the service capability exposure function apparatus.

With reference to the second embodiment, in another possible first implementation, the network element address query request further includes a tracking area identifier, and the processor is further configured to obtain, based on the network slice information, the tracking area identifier, and the network element type indication, the Internet Protocol address that is of the network element and that is to be obtained by the application server.

With reference to the second embodiment, in another possible second implementation, the communicator is further configured to send a tracking area identifier and a network element Internet Protocol address list to the service capability exposure function apparatus.

To achieve the foregoing objective, a third embodiment of the present invention provides a service capability exposure function apparatus collaborating with a domain name system and an application server, including: a memory, configured to store network slice information; a communicator, configured to receive an application request from the application server, where the application request includes application information; and a processor, configured to: obtain network slice information from the memory based on a network slice identifier of the application information, and construct a fully-qualified domain name based on the network slice information, where the communicator is further configured to send the fully-qualified domain name to the domain name system, to obtain an Internet Protocol address of a corresponding network element, and the communicator is further configured to send the application request to the network element based on the Internet Protocol address.

With reference to the third embodiment, in another possible first implementation, the application request further includes location information, the processor is further configured to: obtain a tracking area identifier based on the location information, and construct a tracking area identifier fully-qualified domain name based on the network slice information and the tracking area identifier, the communicator is further configured to send the tracking area identifier fully-qualified domain name to the domain name system, to obtain the Internet Protocol address of the corresponding network element, and the communicator is further configured to send the application request to the network element based on the Internet Protocol address.

To achieve the foregoing objective, a fourth embodiment of the present invention provides a service capability exposure function apparatus collaborating with an application server and a network slice management apparatus, including: a communicator, configured to receive network topology information from the network slice management apparatus and an application request from the application server, where the network topology information includes a network element Internet Protocol address list and a name-identifier relationship between a network slice identifier and a network slice feature name, and the application request includes application information; a memory, configured to store the network topology information; and a processor, configured to: obtain the network slice identifier from the memory based on a network slice name of the application information and the name-identifier relationship, and obtain an Internet Protocol address of a network element from the network element Internet Protocol address list based on the network slice identifier, where the communicator is further configured to send the application request to the network element based on the Internet Protocol address.

With reference to the fourth embodiment, in another possible first implementation, the network topology information further includes a tracking area identifier, the application request further includes location information, and the processor is further configured to: obtain a tracking area identifier corresponding to the location information from the memory based on the location information, and obtain the Internet Protocol address of the network element from the network element Internet Protocol address list based on the network slice identifier and the tracking area identifier.

To achieve the foregoing objective, a fifth embodiment of the present invention provides a network slice management method, applied to a network slice management apparatus, where the network slice management apparatus includes a communicator, a processor, and a memory, the processor is coupled to the communicator and the memory, the memory is configured to store network slice information, and the method includes: receiving, by the communicator, a network element address query request from a service capability exposure function apparatus, where the network element address query request includes application information and a network element type indication, and the network element type indication is used to indicate an Internet Protocol address that is of a network element and that is to be obtained by an application server; obtaining, by the processor, network slice information from the memory based on the application information; obtaining, by the processor based on the network slice information and the network element type indication, the Internet Protocol address that is of the network element and that is to be obtained by the application server; and sending, by the communicator, the Internet Protocol address that is of the network element and that is to be obtained by the application server to the service capability exposure function apparatus.

With reference to the fifth embodiment, in another possible first implementation, the network element address query request further includes a tracking area identifier, and the network slice management method further includes: obtaining, by the processor based on the network slice information, the tracking area identifier, and the network element type indication, the Internet Protocol address that is of the network element and that is to be obtained by the application server.

With reference to the fifth embodiment, in another possible second implementation, the network slice management method further includes: sending, by the communicator, a tracking area identifier and a network element Internet Protocol address list to the service capability exposure function apparatus.

To achieve the foregoing objective, a sixth embodiment of the present invention provides a network slice management method, applied to a service capability exposure function apparatus, where the service capability exposure function apparatus includes a communicator, a processor, and a memory, the processor is coupled to the communicator and the memory, the memory is configured to store network slice information, and the method includes: receiving, by the communicator, an application request from an application server, where the application request includes application information; obtaining, by the processor, network slice information from the memory based on a network slice identifier of the application information; constructing, by the processor, a fully-qualified domain name based on the network slice information; sending, by the communicator, the fully-qualified domain name to a domain name system, to obtain an Internet Protocol address of a corresponding network element; and sending, by the communicator, the application request to the network element based on the Internet Protocol address.

With reference to the sixth embodiment, in another possible first implementation, the application request further includes location information, and the network slice management method further includes: obtaining, by the processor, a tracking area identifier based on the location information; constructing, by the processor, a tracking area identifier fully-qualified domain name based on the network slice information and the tracking area identifier; sending, by the communicator, the tracking area identifier fully-qualified domain name to the domain name system, to obtain the Internet Protocol address of the corresponding network element; and sending, by the communicator, the application request to the network element based on the Internet Protocol address.

To achieve the foregoing objective, a seventh embodiment of the present invention provides a network slice management method, applied to a service capability exposure function apparatus, where the service capability exposure function apparatus includes a communicator, a processor, and a memory, the processor is coupled to the communicator and the memory, and the method includes: receiving, by the communicator, network topology information from a network slice management apparatus; receiving, by the communicator, an application request from an application management apparatus, where the network topology information includes a network element Internet Protocol address list and a name-identifier relationship between a network slice identifier and a network slice feature name, and the application request includes application information; storing, by the memory, the network topology information; obtaining, by the processor, the network slice identifier from the memory based on a network slice name of the application information and the name-identifier relationship; obtaining, by the processor, an Internet Protocol address of a network element from the network element Internet Protocol address list based on the network slice identifier; and sending, by the communicator, the application request to the network element based on the Internet Protocol address.

With reference to the seventh embodiment, in another possible first implementation, the network topology information further includes a tracking area identifier, the application request further includes location information, and the network slice management method further includes: obtaining, by the processor, a tracking area identifier corresponding to the location information from the memory based on the location information; and obtaining, by the processor, the Internet Protocol address of the network element from the network element Internet Protocol address list based on the network slice identifier and the tracking area identifier.

In conclusion, according to the embodiments of the present invention, the service capability exposure function apparatus obtains, based on information provided in an application request, information corresponding to a network slice, and then queries an address of a network element in the network slice and communicates with the network element, so as to ensure that the service capability exposure function apparatus can find a network element in a network slice of a core network.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Table 1 is a table listing definitions of related acronyms and key terms in the subsequent embodiments for reference.

TABLE 1

| Acronym | English Full Name |
|---|---|
| SCEF | Service Capability Exposure Function |
| PCRF | Policy and Charging Rules Function |
| MME | Mobility Management Entity |
| SGSN | Serving GPRS Support Node |
| PGW | PDN Gateway |
| SGW | Serving Gateway |
| 3GPP | 3rd Generation Partnership Project |
| RAI | Routing Area Identifier |
| SAI | Serving Area Identifier |
| CID | Cell Identifier |
| TAI | Tracking Area Identifier |
| QoS | Quality of Service |
| SMARTER | New Services and Markets Technology Enablers |
| DECOR | Dedicated core network |
| MVNO | Mobile Virtual Network Operator |
| IoT | Internet of Things |
| DNS | Domain Name System |
| FQDN | Fully-qualified Domain Name |

Figure 1:
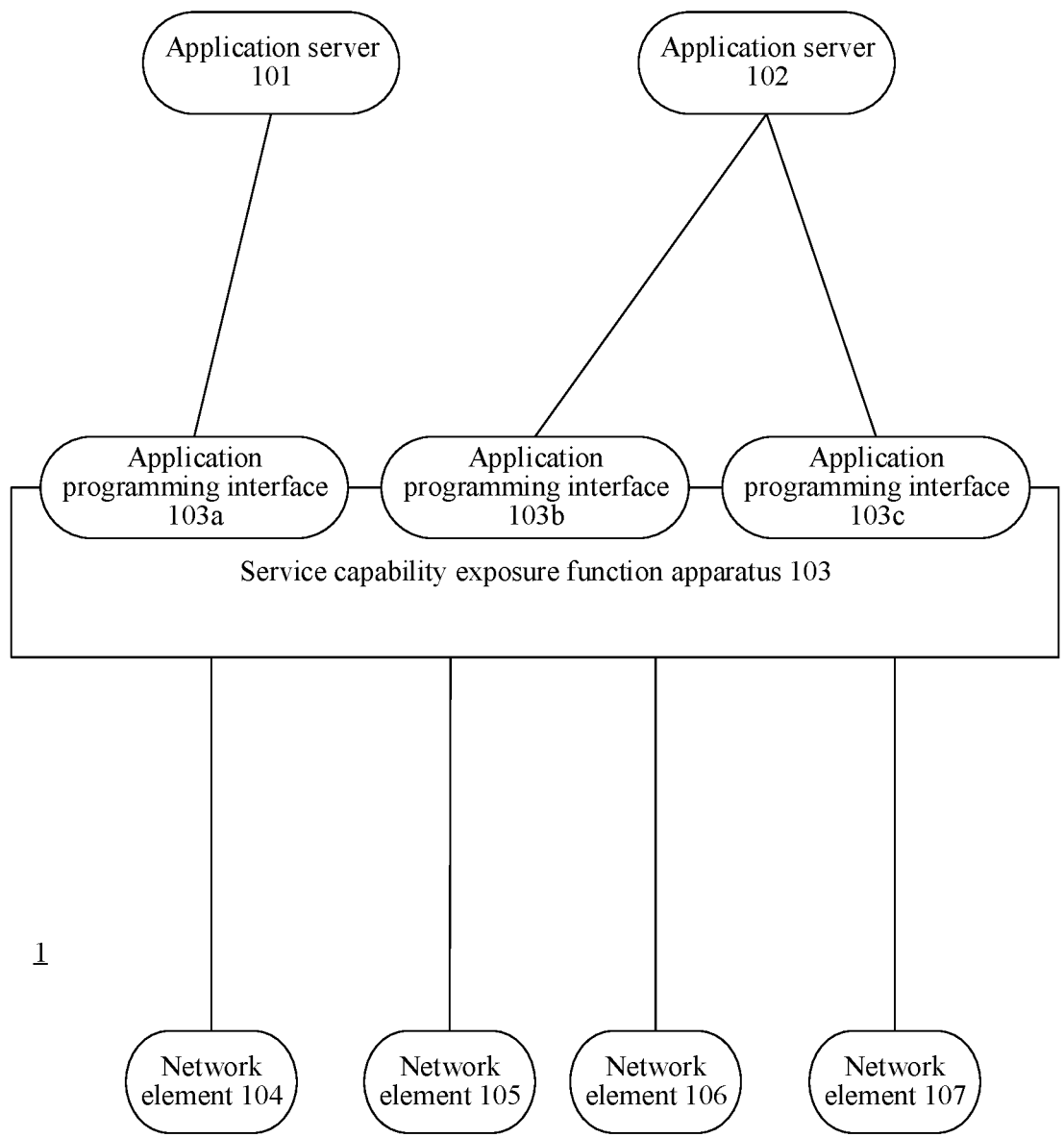
FIG. 1 is a structural diagram of a network architecture.
Figure 2:
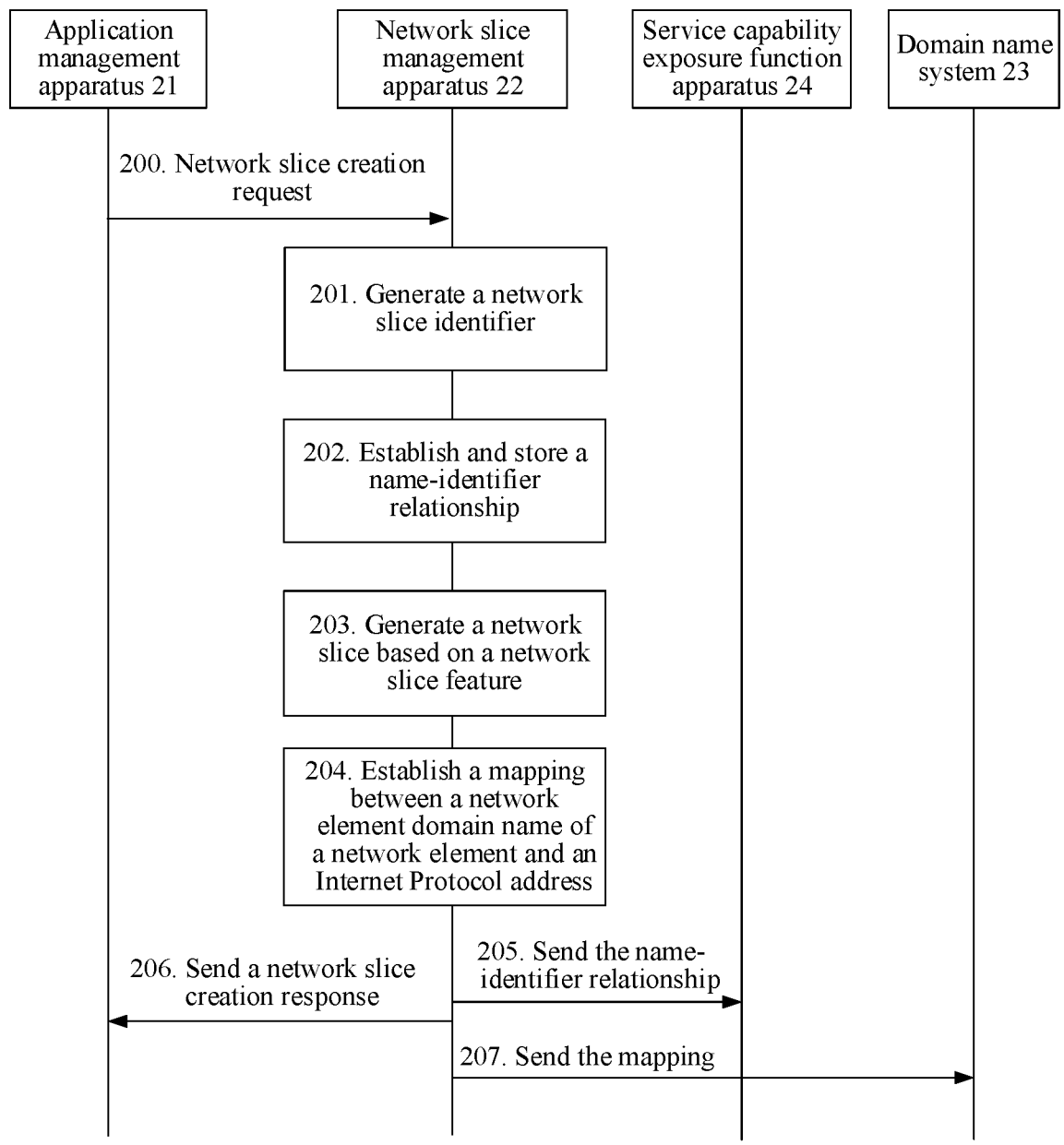
FIG. 2 is a signaling flowchart of a network slice management system according to a first embodiment of the present invention.
Figure 5:
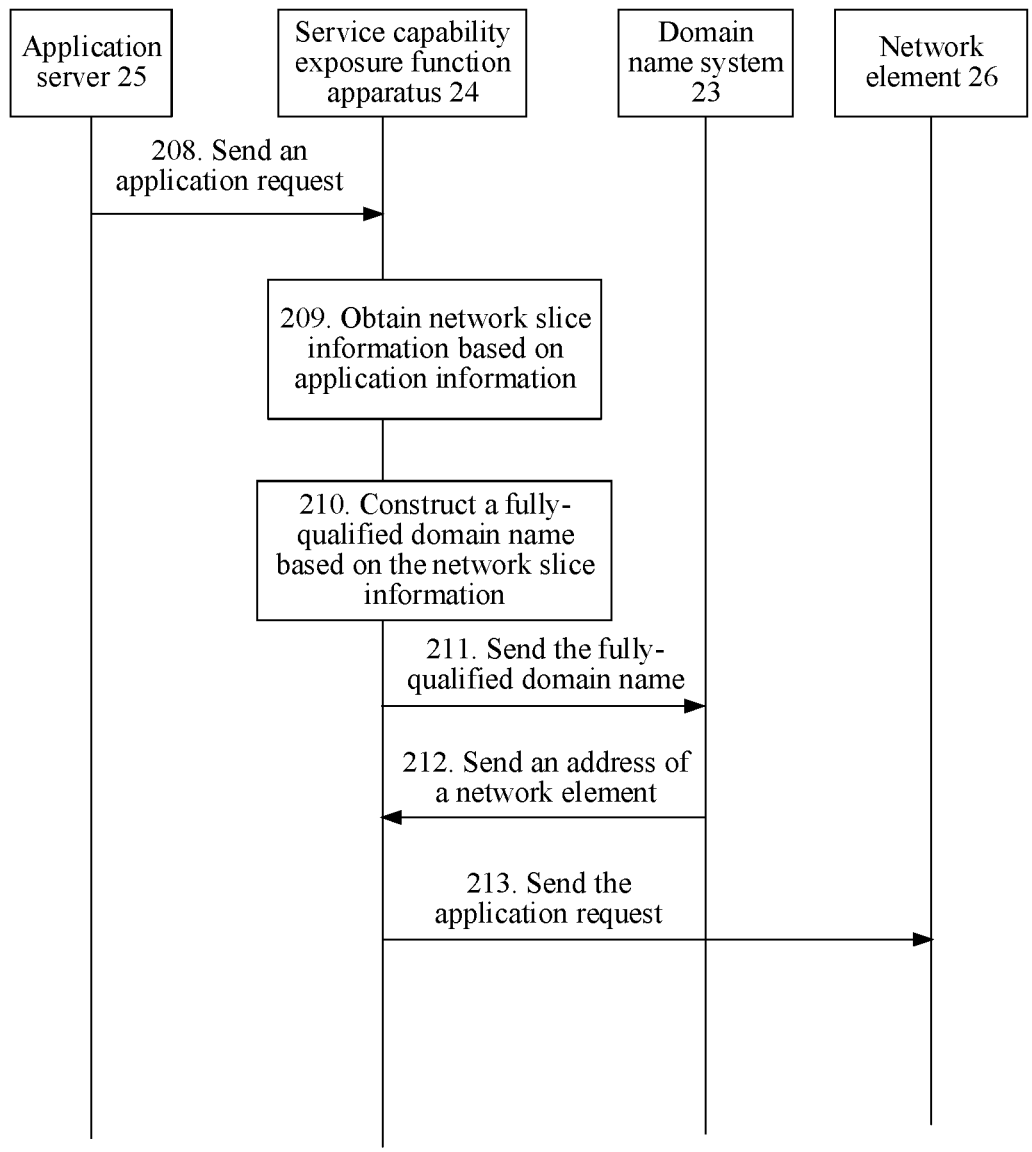
FIG. 5 is a signaling flowchart of a network slice management system according to the first embodiment of the present invention.

FIG. 2 and FIG. 5 are signaling flowcharts of implementing a network slice management method by a network slice management system 2 according to a first embodiment of the present invention. It can be learned from FIG. 2 and FIG. 5 that the network slice management system 2 includes an application management apparatus 21, a network slice management apparatus 22, a domain name system 23, a service capability exposure apparatus 24, an application server 25, and a network element 26. The network slice management apparatus 22 and the service capability exposure apparatus 24 may be two independent apparatuses or may be integrated in a same apparatus. The application management apparatus 21 may communicate with the network slice management apparatus 22 to establish a network slice. The application server 25 can collaborate with the domain name system 23 and the network element 26 through the service capability exposure apparatus 24.

Figure 3:
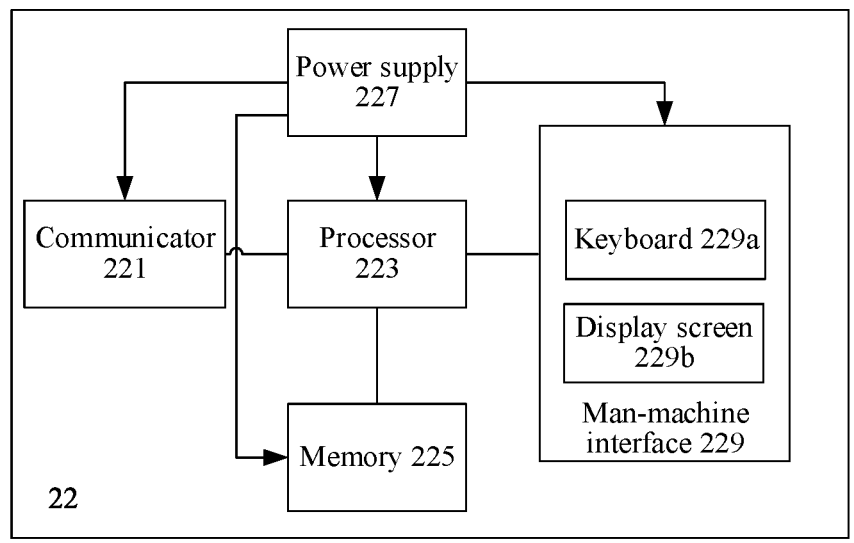
FIG. 3 is a structural diagram of a network slice management apparatus according to the first embodiment of the present invention.

Referring to FIG. 3, FIG. 3 is a structural diagram of the network slice management apparatus 22. It can be learned from FIG. 2 that the network slice management apparatus 22 includes a communicator 221, a processor 223, a memory 225, a power supply 227, and a man-machine interface 229. The processor 223 is coupled to the communicator 221, the memory 225, and the man-machine interface 229. The power supply 227 is configured to supply power to the communicator 221, the processor 223, and the man-machine interface 229. The memory 225 may store an operating system and another application program. A keyboard 229a and a display screen 229b may be connected to the man-machine interface 229. The communicator 221 is configured to perform communication between the network slice management apparatus 22 and another device/apparatus/network element or a communications network. It should be noted that another apparatus may be connected to the man-machine interface 229 based on a requirement of an actual application or the man-machine interface 229 may be omitted. The keyboard 229a and the display screen 229b are only examples.

Figure 4:
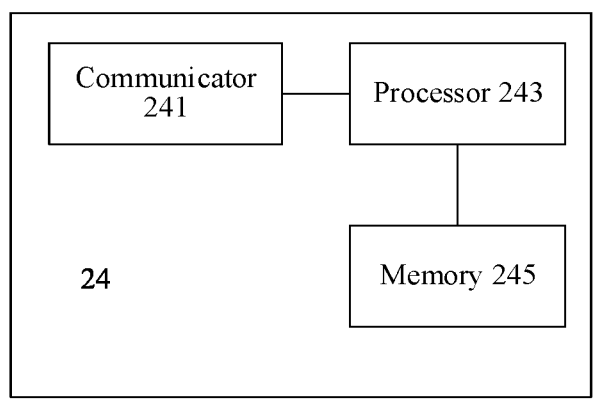
FIG. 4 is a structural diagram of a service capability exposure apparatus according to the first embodiment of the present invention.

Referring to FIG. 4, FIG. 4 is a structural diagram of the service capability exposure apparatus 24. It can be learned from FIG. 4 that the service capability exposure apparatus 24 includes a communicator 241, a processor 243, and a memory 245. The processor 243 is coupled to the communicator 241 and the memory 245. The communicator 241 is configured to perform communication between the service capability exposure apparatus 24 and another device/apparatus or a communications network. The memory 245 may store an operating system and another application program. For simplicity, the following describes effects of a system 2 for managing a network slice with reference to FIG. 2, FIG. 3, FIG. 4, and FIG. 5.

Referring to FIG. 2 first, in step 200, the application management apparatus 21 may send a network slice creation request to the network slice management apparatus 22 based on requirements of different applications, so that the network slice management apparatus 22 creates network slices for the requirements of the applications. Specifically, the application management apparatus 21 may manage MVNO/enterprise/IoT applications. The network slice creation request includes a network slice feature and a network slice feature name. The network slice feature may be considered as a feature of the application. The network slice feature name may be a name chosen by the application management apparatus 21 for the network slice feature, so as to facilitate recording and management by the application management apparatus 21.

In step 201, the communicator 221 of the network slice management apparatus 22 receives the network slice creation request from the application management apparatus 21. The processor 223 of the network slice management apparatus 22 generates a network slice identifier based on the network slice feature of the network slice creation request, so that a network side may recognize a network slice based on the network slice identifier. In step 202, the processor 223 establishes a name-identifier relationship between the network slice identifier and a network slice feature name, so that a network slice identifier corresponding to a network slice feature name can be found based on the network slice feature name. The memory 225 may be configured to store the name-identifier relationship.

In step 203, the processor 223 generates a network slice based on the network slice feature of the network slice creation request. Application of automatic meter reading is used as an example. The network slice feature may not need mobility, use small packet transmission, and have a low real-time requirement. The generated network slice includes a network element that does not need to support mobility and sends data during non-busy hours, and a network element that supports carrying small packets on a control plane and does not support a user plane can be selected. In step 204, the processor 223 establishes a mapping between a network element domain name of a network element included in the network slice and an Internet Protocol address. It should be noted that, if the network slice management system 2 does not include the domain name system 23, step 204 may be appropriately omitted.

Next, in step 205, the communicator 221 of the network slice management apparatus 22 sends the name-identifier relationship to the service capability exposure function apparatus 24. In step 206, the communicator 221 sends a network slice creation response to the application management apparatus 21. The network slice creation response may further include a network slice identifier based on an actual requirement. In other words, it is an optional solution in which the network slice creation response further includes a network slice identifier. In step 207, the communicator 221 sends the mapping between the network element domain name of the network element and the Internet Protocol address to the domain name system 23. It should be noted that, step 207 needs to be performed only when the network slice management system 2 includes the domain name system 23; otherwise, step 207 may be omitted. Step 205, step 206, and step 207 are not performed in a particular order. For example, step 207 may be performed before step 206 and step 205 are performed, or step 206 may be performed before step 205 and step 207 are performed. The foregoing step 200 to step 207 may be considered as a process of creating a network slice. Next, how the application server 25 queries a network slice after the network slice is created is further described.

Referring to FIG. 5, in step 208, the application server 25 sends an application request to the service capability exposure function apparatus 24. In step 209, the communicator 241 of the service capability exposure function apparatus 24 receives the application request. The application request includes application information. The application information may include a network slice feature name or a network slice identifier. If the application information includes a network slice identifier, the processor 243 of the service capability exposure function apparatus 24 obtains network slice information from the memory 245 based on the network slice identifier of the application information.

If the application information includes a network slice feature name, the processor 243 first obtains the network slice identifier from the memory 245 based on the name-identifier relationship between the network slice identifier and the network slice feature name. The processor 243 then obtains network slice information from the memory 245 based on the network slice identifier of the application information. The obtained network slice information may include, but is not limited to, an Internet Protocol address, domain name information, and a network element configuration state of the network element. In step 210, the processor 243 constructs a fully-qualified domain name based on the network slice information, which may be specifically: a host name of a PCRF carries the network slice information, that is, the fully-qualified domain name carries the network slice information, for example: slice identifier.tac.epc.mnc<MNC>.mcc<MCC>.3gppnetwork.org.

In step 211, the communicator 241 of the service capability exposure function apparatus 24 sends the fully-qualified domain name to the domain name system 23. In step 212, after receiving the fully-qualified domain name, the domain name system 23 may obtain the Internet Protocol address of the corresponding network element based on the fully-qualified domain name and the mapping that is between the network element domain name of the network element and the Internet Protocol address and that is stored at a local end. In step 212, the domain name system 23 sends the Internet Protocol address to the service capability exposure function apparatus 24. In step 213, the communicator 241 of the service capability exposure function apparatus 24 sends the application request to the network element 26 based on the Internet Protocol address.

For example, the network element 26 is a PCRF, the application request is a QoS request for accessing an application through the service capability exposure function apparatus 24, and when a user accesses the application, QoS of a service flow corresponding to the application is guaranteed. After the communicator 241 of the service capability exposure function apparatus 24 sends the application request to the PCRF based on an Internet Protocol address, the PCRF may guarantee, based on the application request, QoS of a service flow corresponding to the application.

In another example, the application request further includes location information, and in step 209, the processor 243 of the service capability exposure function apparatus 24 may obtain, based on the location information, a corresponding tracking area identifier. In step 210, the processor 243 constructs a tracking area identifier fully-qualified domain name based on the network slice information and the tracking area identifier, which may be specifically: a slice identifier, for example, slice identifier.tac-lb<TAC-low-byte>.tac-hb<TAC-high-byte>.tac.epc.mnc<MNC>.mcc<MCC>.3gppnetwork.org, is extended in the tracking area identifier fully-qualified domain name.

In step 211, the communicator 241 of the service capability exposure function apparatus 24 sends the tracking area identifier fully-qualified domain name to the domain name system 23. In step 212, after receiving the tracking area identifier fully-qualified domain name, the domain name system 23 may obtain the Internet Protocol address of the corresponding network element based on the tracking area identifier fully-qualified domain name and the mapping that is between the network element domain name of the network element and the Internet Protocol address and that is stored at a local end. In step 212, the domain name system 23 sends the Internet Protocol address to the service capability exposure function apparatus 24. In step 213, the communicator 241 of the service capability exposure function apparatus 24 sends the application request to the network element 26 based on the Internet Protocol address.

For example, the network element 26 is an MME/SGSN, and the application request is used to request to obtain a quantity of users in a geographical region through the service capability exposure function apparatus 24. After the communicator 241 of the service capability exposure function apparatus 24 sends the application request to the MME/SGSN based on the Internet Protocol address, the MME/SGSN may return the quantity of users in the geographical region to the application server 25 based on the application request through the service capability exposure function apparatus 24.

In conclusion, according to the first embodiment of the present invention, the service capability exposure function apparatus 24 obtains, based on information provided in an application request, information corresponding to a network slice, and then queries an address of a network element in the network slice and communicates with the network element, so as to ensure that the service capability exposure function apparatus 24 can find a network element in a network slice of a core network.

Figure 6:
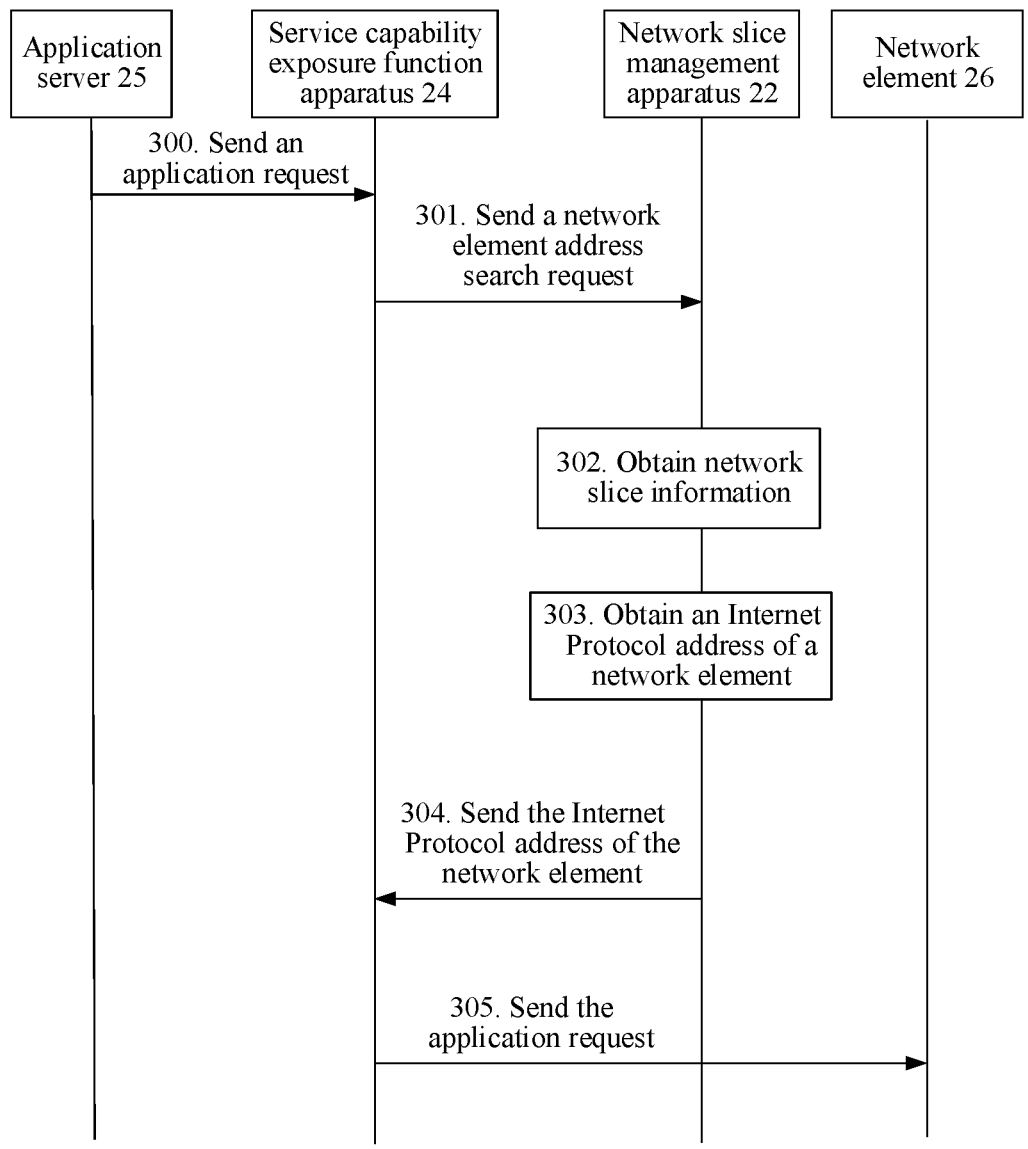
FIG. 6 is a signaling flowchart of a network slice management system according to a second embodiment of the present invention.

FIG. 6 is a signaling flowchart of implementing a network slice management method by a network slice management system 3 according to a second embodiment of the present invention. It can be learned from FIG. 6 that the network slice management system 3 includes a network slice management apparatus 22, a service capability exposure apparatus 24, an application server 25, and a network element 26. The network slice management apparatus 22 and the service capability exposure apparatus 24 may be two independent apparatuses or may be integrated in a same apparatus. The application server 25 can collaborate with the network slice management apparatus 22 and the network element 26 through the service capability exposure apparatus 24. It should be noted herein that this embodiment focuses on how the application server 25 queries a network slice after the network slice is created. Refer to the related description of step 200 to step 207 in the first embodiment for a process of creating a network slice, and details are not described herein.

In step 300, the application server 25 sends an application request to the service capability exposure function apparatus 24, where the application request includes application information and a network element type indication, and the network element type indication is used to indicate a network element having an Internet Protocol address to be obtained by the application server 25. The application request includes application information, and the application information may include a network slice feature name or a network slice identifier.

In step 301, a communicator 241 of the service capability exposure function apparatus 24 receives the application request and sends a network element address query request to the network slice management apparatus 22 based on the application request. The network element address query request includes application information and a network element type indication. The application information may include a network slice feature name or a network slice identifier.

In step 302, a communicator 221 of the network slice management apparatus 22 receives the network element address query request. If the application information includes a network slice identifier, a processor 223 of the network slice management apparatus 22 obtains network slice information from a memory 225 based on the network slice identifier of the application information. If the application information includes a network slice feature name, the processor 223 first obtains the network slice identifier from the memory 225 based on a name-identifier relationship between the network slice identifier and a network slice feature name. The processor 223 then obtains network slice information from the memory 225 based on the network slice identifier of the application information. The obtained network slice information may include, but is not limited to, an Internet Protocol address, domain name information, and a network element configuration state of a network element.

In step 303, the processor 223 obtains, based on the network slice information and the network element type indication, the Internet Protocol address that is of the network element and that is to be obtained by the application server 25. In step 304, the communicator 221 sends the Internet Protocol address that is of the network element and that is to be obtained by the application server 25 to the service capability exposure function apparatus 24. In step 305, the communicator 241 of the service capability exposure function apparatus 24 sends the application request to the network element 26 based on the Internet Protocol address.

For example, the network element 26 is a PCRF, the application request is a QoS request for accessing an application through the service capability exposure function apparatus 24, and when a user accesses the application, QoS of a service flow corresponding to the application is guaranteed. Therefore, the network element type indication is used to indicate that the network element having the Internet Protocol address to be obtained by the application server 25 is a PCRF. After the communicator 241 of the service capability exposure function apparatus 24 sends the application request to the PCRF based on the Internet Protocol address, the PCRF may guarantee, based on the application request, QoS of a service flow corresponding to the application.

In another example, the application request further includes location information, and in step 301, a processor 243 of the service capability exposure function apparatus 24 may obtain a corresponding tracking area identifier based on the location information. The communicator 241 sends a network element address query request to the network slice management apparatus 22 based on the application request. The network element address query request includes a tracking area identifier, an application information, and a network element type indication. The application information may include a network slice feature name or a network slice identifier. How to obtain the network slice information is discussed in the foregoing step 302, and details are not described herein again. In step 303, the processor is configured to obtain, based on the network slice information, the tracking area identifier, and the network element type indication, the Internet Protocol address that is of the network element and that is to be obtained by the application server 25. Next, step 304 and step 305 described above are performed, and details are not described herein again.

For example, the network element 26 is an MME/SGSN, and the application request is used to request to obtain a quantity of users in a geographical region through the service capability exposure function apparatus 24. Therefore, the network element type indication is used to indicate that the network element having the Internet Protocol address to be obtained by the application server 25 is an MME/SGSN. After the communicator 241 of the service capability exposure function apparatus 24 sends the application request to the MME/SGSN based on the Internet Protocol address, the MME/SGSN may return the quantity of users in the geographical region to the application server 25 based on the application request through the service capability exposure function apparatus 24.

In conclusion, according to the second embodiment of the present invention, the service capability exposure function apparatus 24 obtains, based on information provided in an application request, information corresponding to a network slice, and then queries an address of a network element in the network slice and communicates with the network element, so as to ensure that the service capability exposure function apparatus 24 can find a network element in a network slice of a core network.

Figure 7:
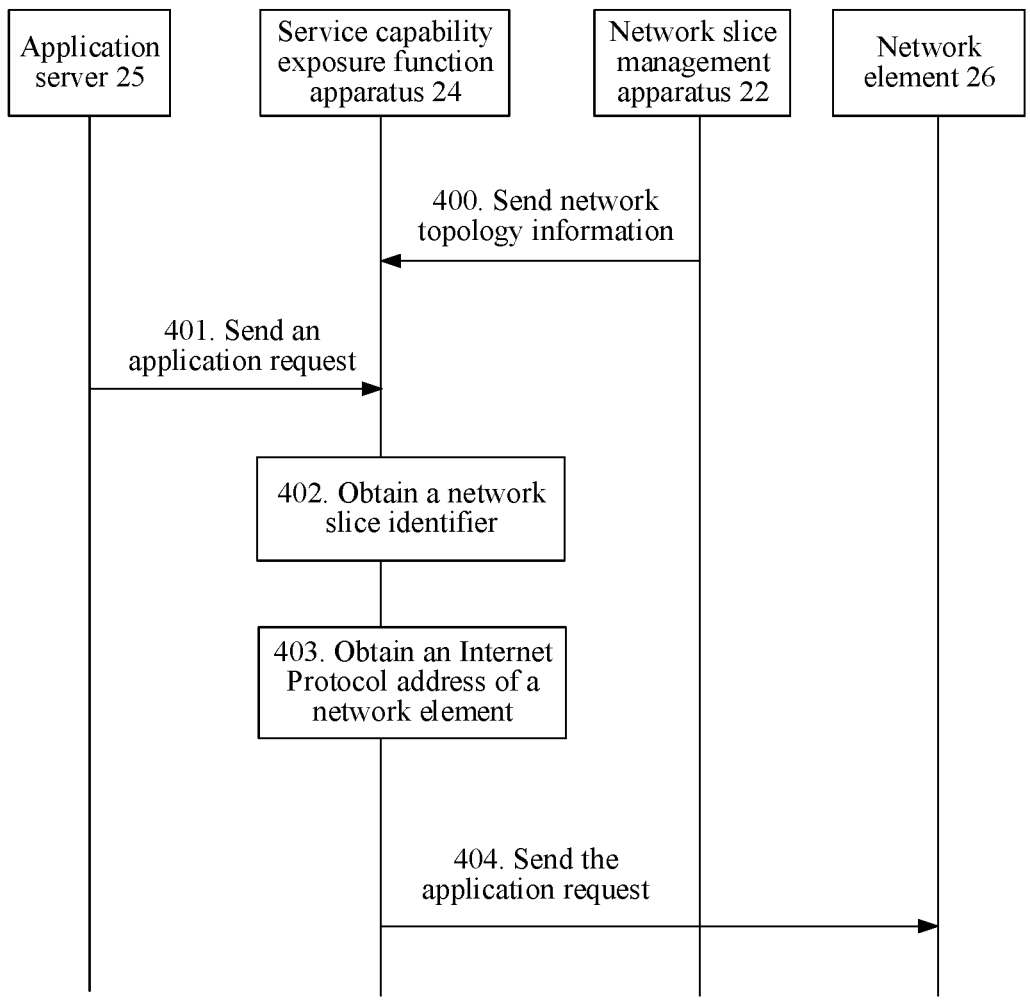
FIG. 7 is a signaling flowchart of a network slice management system according to a third embodiment of the present invention.

FIG. 7 is a signaling flowchart of implementing a network slice management method by a network slice management system 4 according to a third embodiment of the present invention. It can be learned from FIG. 7 that the network slice management system 4 includes a network slice management apparatus 22, a service capability exposure apparatus 24, an application server 25, and a network element 26. The network slice management apparatus 22 and the service capability exposure apparatus 24 may be two independent apparatuses or may be integrated in a same apparatus. The application server 25 can collaborate with the network slice management apparatus 22 and the network element 26 through the service capability exposure apparatus 24. It should be noted herein that this embodiment focuses on how the application server 25 queries a network slice after the network slice is created. For a process of creating a network slice, refer to the related description of step 200 to step 207 in the first embodiment, and details are not described herein.

In step 400, a communicator 221 of the network slice management apparatus 22 sends network topology information to the service capability exposure apparatus 24. The network topology information includes, but is not limited to, a network element Internet Protocol address list and a name-identifier relationship between a network slice identifier and a network slice feature name. The network element Internet Protocol address list is used to record an Internet Protocol address of a network element. A communicator 241 of the service capability exposure apparatus 24 receives the network topology information, and stores the network topology information in a memory 245.

In step 401, the application server 25 sends an application request to the service capability exposure function apparatus 24. The application request includes application information. The application information may include a network slice feature name or a network slice identifier. In step 402, the communicator 241 of the service capability exposure apparatus 24 receives the application request. If the application information includes a network slice feature name, a processor 243 of the service capability exposure apparatus 24 obtains the network slice identifier from the memory 245 based on the network slice name of the application information and the name-identifier relationship. If the application information includes a network slice identifier, step 402 may be omitted.

In step 403, the processor 243 obtains the Internet Protocol address of the network element from the network element Internet Protocol address list based on the network slice identifier. In step 404, the communicator 241 sends the application request to the network element 26 based on the Internet Protocol address of the network element.

For example, the network element 26 is a PCRF, the application request is a QoS request for accessing an application through the service capability exposure function apparatus 24, and when a user accesses the application, QoS of a service flow corresponding to the application is guaranteed. After the communicator 241 of the service capability exposure function apparatus 24 sends the application request to the PCRF based on the Internet Protocol address, the PCRF may guarantee, based on the application request, QoS of a service flow corresponding to the application.

In another example, the network topology information further includes a tracking area identifier, and the application request further includes location information. In step 402, if the application information includes a network slice feature name, the processor 243 obtains the network slice identifier from the memory 245 based on the network slice name of the application information and the name-identifier relationship, and further obtains the tracking area identifier corresponding to the location information from the memory 245 based on the location information. If the application information includes a network slice identifier, in step 402, the processor 243 obtains only the tracking area identifier corresponding to the location information from the memory 245 based on the location information. In step 403, the processor 243 obtains the Internet Protocol address of the network element from the network element Internet Protocol address list based on the network slice identifier and the tracking area identifier.

For example, the network element 26 is an MME/SGSN, and the application request is used to request to obtain a quantity of users in a geographical region through the service capability exposure function apparatus 24. After the communicator 241 of the service capability exposure function apparatus 24 sends the application request to the MME/SGSN based on the Internet Protocol address, the MME/SGSN may return the quantity of users in the geographical region to the application server 25 based on the application request through the service capability exposure function apparatus 24.

In conclusion, according to the third embodiment of the present invention, the service capability exposure function apparatus 24 obtains, based on information provided in an application request, information corresponding to a network slice, and then queries an address of a network element in the network slice and communicates with the network element, so as to ensure that the service capability exposure function apparatus 24 can find a network element in a network slice of a core network.

Figure 8:
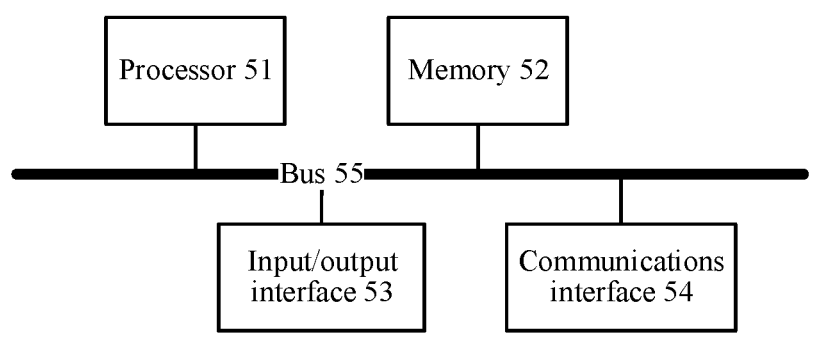
FIG. 8 is a schematic structural diagram of hardware of a service capability exposure function apparatus according to an embodiment of the present invention.

FIG. 8 is a schematic structural diagram of hardware of a service capability exposure function apparatus 5 according to an embodiment of the present invention. As shown in FIG. 8, the service capability exposure function apparatus 5 includes a processor 51, a memory 52, an input/output interface 53, a communications interface 54, and a bus 55. The processor 51, the memory 52, the input/output interface 53, and the communications interface 54 implement mutual communication and connection through the bus 55.

The processor 51 may be a general-purpose central processing unit (CPU), a microprocessor, an application-specific integrated circuit (ASIC), or one or more integrated circuits, so as to execute a related program to implement the technical solution provided in this embodiment of the present invention.

The memory 52 may be a read-only memory (ROM), a static storage device, a dynamic storage device, or a random-access memory (RAM). The memory 52 may store an operating system and another application program. When implementing the technical solution provided in this embodiment of the present invention by means of software or firmware, program code for implementing the technical solution provided in this embodiment of the present invention is stored in the memory 52 and is executed by the processor 51.

The input/output interface 53 is configured to: receive data and information that are input, and output data such as an operation result.

The communications interface 54 uses, for example, but not limited to, a transceiver apparatus such as a communicator and a transceiver module to implement communication between the service capability exposure function apparatus 5 and another device or a communications network.

The bus 55 may include a path for transferring information between various components (for example, the processor 51, the memory 52, the input/output interface 53, and the communications interface 54) of the service capability exposure function apparatus 5.

It should be noted that although only the processor 51, the memory 52, the input/output interface 53, the communications interface 54, and the bus 55 are shown in the service capability exposure function apparatus 5 shown in FIG. 8, during specific implementation, a person skilled in the art should understand that the service capability exposure function apparatus 5 further includes other devices required for normal running. Meanwhile, based on specific requirements, a person skilled in the art should understand that the service capability exposure function apparatus 5 may further include hardware devices for implementing other additional functions. In addition, a person skilled in the art should understand that the service capability exposure function apparatus 5 may alternatively include only devices or modules required for implementing this embodiment of the present invention, and does not need to include all the devices shown in FIG. 8.

The hardware structure shown in FIG. 8 and the foregoing description are applicable to various network slice management apparatuses provided in the embodiments of the present invention.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM, Read-Only Memory), or a random-access memory (RAM, Random Access Memory).

Specific examples are used in this specification to describe the principle and implementations of the present invention. The descriptions of the foregoing embodiments are merely intended to help understand the method and idea of the present invention. In addition, with regard to the implementations and the application scope, modifications may be made by a person of ordinary skill in the art according to the idea of the present invention. Therefore, this specification shall not be construed as a limitation on the present invention.

What is claimed is:

1. A network slice management apparatus collaborating with a service capability exposure function apparatus and an application server, comprising:
   a memory, configured to store network slice information;
   a communicator, configured to receive a network element address query request from the service capability exposure function apparatus, wherein the network element address query request comprises application information and a network element type indication, and the network element type indication indicates a network element having an Internet Protocol address; and
   at least one processor, configured to:
      in response to receiving the network element address query request from the service capability exposure function apparatus:
         obtain network slice information from the memory based on the received application information; and
         after obtaining the network slice information, obtain, based on the obtained network slice information and the received network element type indication, the Internet Protocol address of the network element;
   wherein the communicator is further configured to send the Internet Protocol address of the network element to the service capability exposure function apparatus.

2. The network slice management apparatus according to claim 1, wherein the network element address query request further comprises a tracking area identifier, and wherein the at least one processor is further configured to obtain, based on the network slice information, the tracking area identifier, and the network element type indication, the Internet Protocol address of the network element.

3. The network slice management apparatus according to claim 1, wherein the communicator is further configured to send a tracking area identifier and a network element Internet Protocol address list to the service capability exposure function apparatus.

4. A network slice management method, applied to a network slice management apparatus, wherein the network slice management apparatus comprises a communicator, at least one processor, and a memory, the at least one processor is coupled to the communicator and the memory, the memory is configured to store network slice information, and wherein the method comprises:
   receiving, by the communicator, a network element address query request from a service capability exposure function apparatus, wherein the network element address query request comprises application information and a network element type indication, and the network element type indication indicates a network element having an Internet Protocol address; and
   in response to receiving the network element address query request from the service capability exposure function apparatus:
      obtaining, by the at least one processor, network slice information from the memory based on the received application information;
      after obtaining the network slice information, obtaining, by the at least one processor and based on the obtained network slice information and the received network element type indication, the Internet Protocol address of the network element; and
      sending, by the communicator, the Internet Protocol address of the network element to the service capability exposure function apparatus.

5. The network slice management method according to claim 4, wherein the network element address query request further comprises a tracking area identifier, and wherein the network slice management method further comprises:
   obtaining, by the at least one processor and based on the network slice information, the tracking area identifier, and the network element type indication, the Internet Protocol address of the network element.

6. The network slice management method according to claim 4, wherein the network slice management method further comprises:
   sending, by the communicator, a tracking area identifier and a network element Internet Protocol address list to the service capability exposure function apparatus.

* * * * *